United States Patent
Salois et al.

(10) Patent No.: US 11,427,339 B2
(45) Date of Patent: Aug. 30, 2022

(54) PASSIVE HEAD AND NECK PROTECTION CANOPY PIERCER (71) Applicant: GOODRICH CORPORATION, Charlotte, NC (US)

(72) Inventors: Matthew D Salois, Berwick, ME (US); Jeff Benjamin, Colorado Springs, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 350 days.

(21) Appl. No.: 16/220,828

(22) Filed: Dec. 14, 2018

(65) Prior Publication Data

US 2020/0189757 A1 Jun. 18, 2020

(51) Int. Cl.
*B64D 25/10* (2006.01)
*B64D 25/04* (2006.01)
*B64D 11/06* (2006.01)
*B64C 1/14* (2006.01)

(52) U.S. Cl.
CPC ............ *B64D 25/10* (2013.01); *B64C 1/1476* (2013.01); *B64D 11/0642* (2014.12); *B64D 11/0689* (2013.01); *B64D 25/04* (2013.01)

(58) Field of Classification Search
CPC ........ B64D 25/08; B64D 25/10; B64D 25/12; B64D 25/04; B64D 11/0642; B64D 11/0689; B64C 1/1476
See application file for complete search history.

(56) References Cited

U.S. PATENT DOCUMENTS

| 2,780,961 | A | | 2/1957 | Musser et al. | |
|---|---|---|---|---|---|
| 3,525,490 | A | | 8/1970 | Duncan et al. | |
| 3,561,703 | A | * | 2/1971 | Stencel | B64C 1/32 244/122 R |
| 3,880,387 | A | * | 4/1975 | Martin, Jr. | B64C 1/32 244/121 |
| 4,275,858 | A | * | 6/1981 | Bolton | B64D 25/10 244/121 |
| 4,480,806 | A | | 11/1984 | Duncan | |
| 4,570,879 | A | | 2/1986 | Dupin | |
| 5,072,896 | A | | 12/1991 | McIntyre et al. | |
| 5,104,067 | A | | 4/1992 | McIntyre et al. | |
| 5,301,904 | A | | 4/1994 | Guill | |
| 7,500,639 | B2 | | 3/2009 | Mastrolia | |
| 2010/0155535 | A1 | * | 6/2010 | Mastrolia | B64D 25/10 244/122 AG |

FOREIGN PATENT DOCUMENTS

GB 888751 2/1962

* cited by examiner

*Primary Examiner* — Philip J Bonzell
*Assistant Examiner* — Ashesh Dangol
(74) *Attorney, Agent, or Firm* — Snell & Wilmer L.L.P.

(57) ABSTRACT

An ejection seat for an aircraft is disclosed. In various embodiments, the ejection seat includes a seat frame; and a moveable headrest attached to the seat frame, the moveable headrest including a first piercer assembly configured for fracturing a canopy.

20 Claims, 6 Drawing Sheets

PASSIVE HEAD AND NECK PROTECTION CANOPY PIERCER

FIELD

The present disclosure relates generally to interior equipment for aircraft and, more particularly, to canopy piercers used with ejection seats for aircraft.

BACKGROUND

Many aircraft employ ejection seats configured to rapidly eject pilots or other occupants from the aircraft in the event of malfunction. Ejection seats are typically located under or proximate a canopy enclosing a cockpit of the aircraft. Following initiation of an ejection sequence, the canopy must generally be removed from the path of the ejection seat. Removal of the canopy is typically accomplished via a canopy jettison system or a canopy fracture system. In the latter case, a canopy piercer, configured to fracture the canopy, may be mounted on a headrest or at some other location of the ejection seat. Fracturing the canopy via a seat-mounted canopy piercer, however, may expose the ejection seat occupant to various hazards, as the fracturing pattern of the canopy is unpredictable and may not propagate completely through the canopy. For example, following fracture of the canopy, portions of the canopy may nevertheless remain overhead and come into contact with an occupant's head, shoulders or legs during expulsion of the ejection seat and the occupant seated thereon.

SUMMARY

An ejection seat for an aircraft is disclosed. In various embodiments, the ejection seat includes a seat frame; and a moveable headrest attached to the seat frame, the moveable headrest including a first piercer assembly configured for fracturing a canopy.

In various embodiments, the moveable headrest includes a head panel and the first piercer assembly is attached to the head panel. In various embodiments, the first piercer assembly includes a first hollow tube and a first piercer slidably disposed within the first hollow tube. In various embodiments, the moveable headrest includes a strut disposed proximate a first side of the head panel. In various embodiments, the strut comprises a second hollow tube and a second piercer slidably disposed within the second hollow tube and configured for fracturing the canopy.

In various embodiments, the moveable headrest includes a first strut disposed on a first side of the moveable headrest. In various embodiments, the first piercer assembly includes the first strut and a first piercer slidably disposed within the first strut. In various embodiments, the ejection seat includes a second piercer assembly configured for fracturing the canopy. In various embodiments, the second piercer assembly includes a second strut and a second piercer slidably disposed within the second strut. In various embodiments, the second strut is disposed on a second side of the moveable headrest. In various embodiments, the ejection seat includes a head panel and a third piercer assembly mounted on the head panel and configured for fracturing the canopy.

A system for fracturing a canopy of an aircraft is disclosed. In various embodiments, the system includes an ejection seat having a seat frame; and a moveable headrest attached to the seat frame, the moveable headrest including a first piercer assembly configured for fracturing the canopy.

In various embodiments, the moveable headrest includes a first strut disposed on a first side of the moveable headrest and a second strut disposed on a second side of the moveable headrest. In various embodiments, the first piercer assembly includes the first strut. In various embodiments, the system includes a second piercer assembly. In various embodiments, the second piercer assembly includes the second strut. In various embodiments, the system includes at least one of an aft piercer assembly disposed aft of the ejection seat and configured for fracturing the canopy and a forward piercer assembly disposed forward of the ejection seat and configured for fracturing the canopy.

A method of ejecting an occupant from an aircraft cockpit covered by a canopy is disclosed. In various embodiments, the method includes the steps of propelling an ejection seat having a seat frame toward the canopy; pivoting a moveable headrest attached to the seat frame, the moveable headrest including a first piercer assembly configured for fracturing the canopy; and activating the first piercer assembly to fracture the canopy.

In various embodiments, the system further includes activating a second piercer assembly attached to the moveable headrest. In various embodiments, the moveable headrest includes a first strut disposed on a first side of the moveable headrest and wherein the first piercer assembly includes the first strut.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
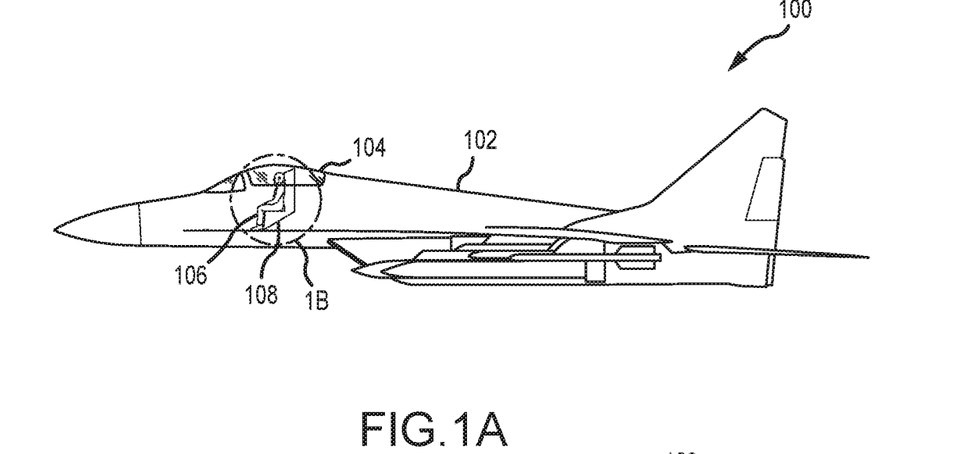
FIG. 1A is a simplified side view of an aircraft having a canopy, in accordance with various embodiments.

Referring now to FIG. 1A, an aircraft 100 is illustrated. In various embodiments, the aircraft 100 includes a fuselage 102 and a canopy 104 enclosing an internal cockpit in which an occupant 106 (e.g., a pilot) is positioned while operating the aircraft 100. An ejection seat 108 is disposed within the cockpit and configured to accommodate the occupant 106 during operation of the aircraft 100 as well as during an ejection sequence occurring in the event of a malfunction of the aircraft 100.

Figure 1B:
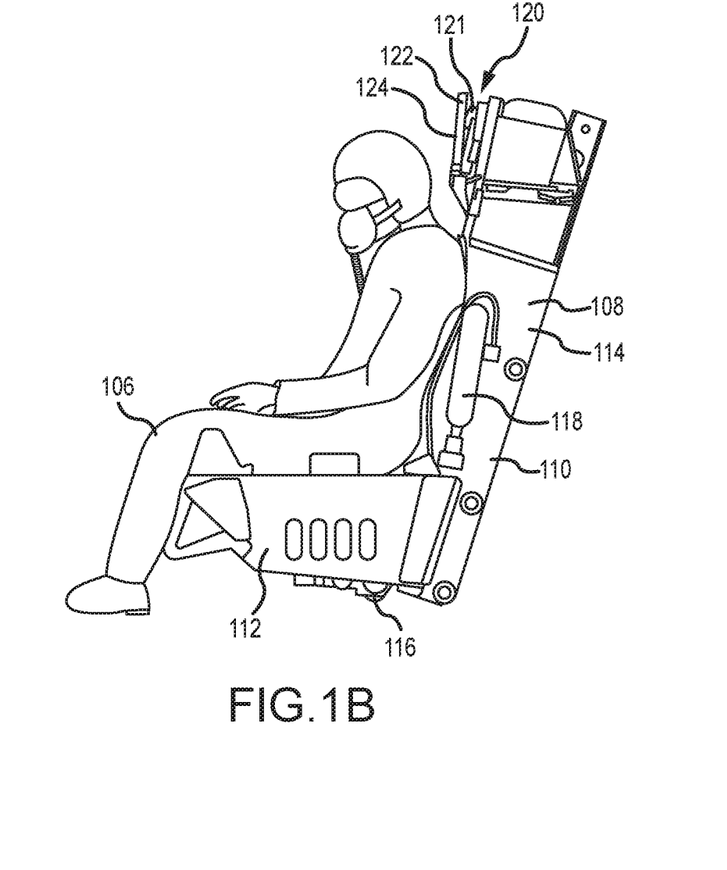
FIG. 1B is an exploded side view of a crewmember and an upright ejection seat of the aircraft of FIG. 1A, in accordance with various embodiments.

Referring now to FIG. 1B, the ejection seat 108 is illustrated with the occupant 106 positioned thereon. In various embodiments, the ejection seat 108 includes a seat frame 110 comprising a seat base 112 and a seat back 114 adapted to support the occupant 106. The ejection seat 108 is equipped with a propulsion subsystem typically comprising a catapult and a rocket motor 116 for propelling the seat frame 110 free of the aircraft 100 in response to an eject signal. In various embodiments, the ejection seat 108 is further equipped with a remote oxygen supply 118 and may include other features typically associated with ejection mechanisms.

Figure 2A:
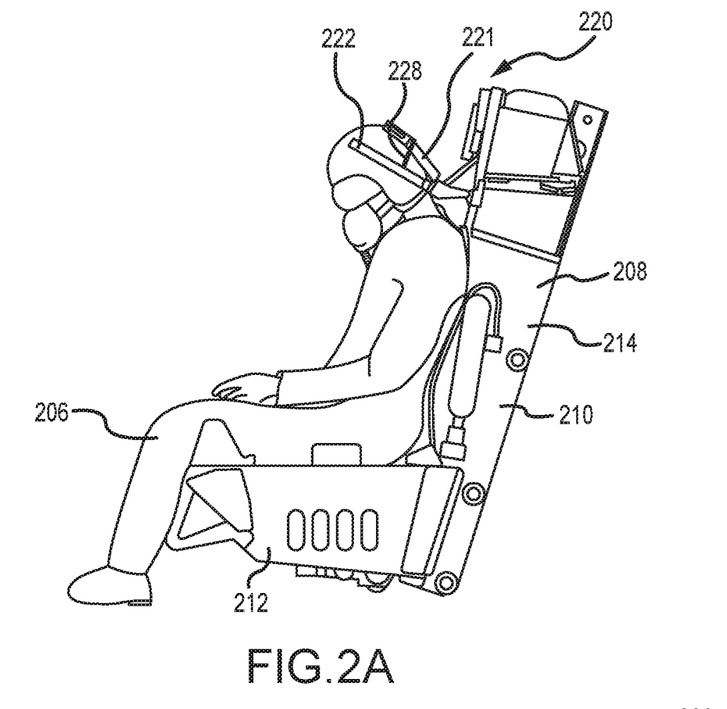
FIG. 2A is a side view of an ejection seat with a moveable headrest in a deployed position, in accordance with various embodiments.

In various embodiments, the ejection seat 108 includes a moveable headrest 120 configured to deploy from a stowed position as shown in FIG. 1B to a deployed position as shown in FIG. 2A to support the head of the occupant 106 from above and behind in a tilted forward orientation. Supporting the head of the occupant 106 from above and behind, as illustrated, reduces a tendency of the head to jerk upward and back due to the sudden wind blast upon exiting the aircraft 100. In various embodiments, the moveable headrest 120 comprises a pair of struts, including a left strut 122 (or first strut) and a right strut 124 (or second strut, illustrated to the right of and behind the left strut 122 in FIG. 1B) that are pivotably attached to the seat back 114 of the seat frame 110. In various embodiments, the moveable headrest 120 further includes a head panel 121 that is also pivotably attached to the seat back 114 of the seat frame 110. In various embodiments, the head panel 121, together with the left strut 122 and the right strut 124, when deployed, as shown in FIG. 2A, provide a structure that prevents undesired movement of the head of the occupant 106 during an ejection sequence. The various components just described are sometimes referred to, collectively, as a passive head and neck protection system.

Figure 2B:
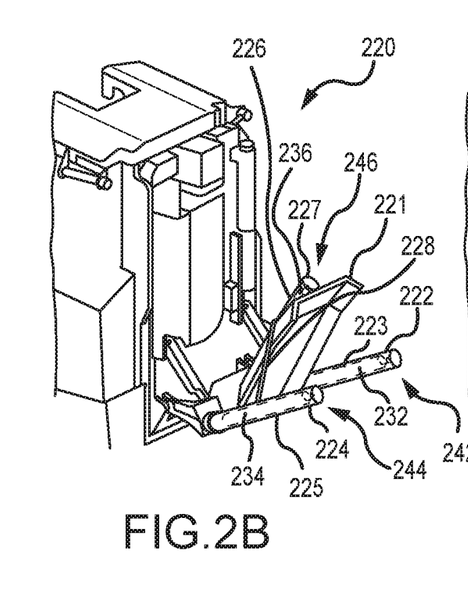
FIGS. 2B and 2C provide perspective views of a moveable headrest having one or more piercer assemblies, in accordance with various embodiments.
Figure 2C:
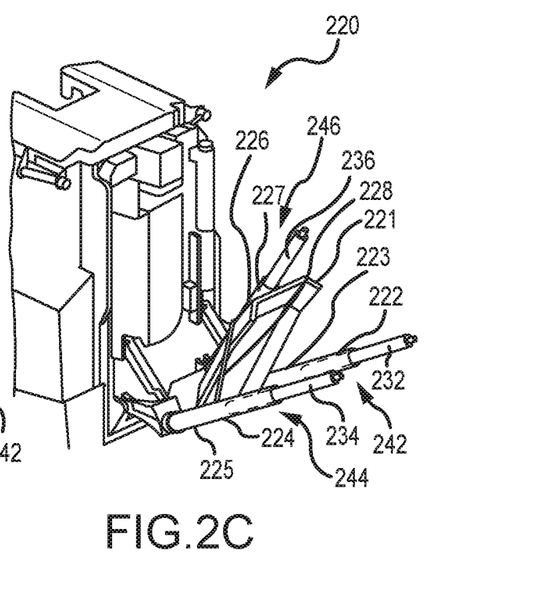

Referring now to FIGS. 2A, 2B and 2C, an ejection seat 208, similar to the ejection seat 108 described above with reference to FIG. 1B, is shown. The ejection seat 208 includes a seat frame 210, a seat base 212 and a seat back 214. The ejection seat further includes a moveable headrest 220 that is illustrated in the deployed position and configured to support the head of an occupant 206 positioned in the ejection seat 208. In various embodiments, the moveable headrest 220 comprises a pair of struts, including a left strut 222 (or first strut) and a right strut 224 (or second strut) that are pivotably attached to the seat back 214 of the seat frame 210. In various embodiments, the moveable headrest 220 further includes a head panel 221 that is also pivotably attached to the seat back 214 of the seat frame 210. In various embodiments, a strap 228 connects the head panel 221 to both the left strut 222 and the right strut 224 so the three components of the moveable headrest 220 deploy in unison upon initiation of an ejection sequence.

Referring more specifically to FIGS. 2B and 2C, the moveable headrest 220 is illustrated having one or more piercer assemblies configured to fracture a canopy, such as, for example, the canopy 104 described above with reference to FIG. 1A, upon initiation of an ejection sequence. In various embodiments, for example, a left piercer assembly 242 (or first piercer assembly) comprises the left strut 222 and a left piercer 232 slidably disposed within the left strut 222 and a right piercer assembly 244 (or second piercer assembly) comprises the right strut 224 and a right piercer 234 disposed within the right strut 224. In various embodiments, the left strut 222 comprises a left tube 223 (or first tube) having an inner tube diameter configured to receive and house the left piercer 232 and the right strut 224 comprises a right tube 225 (or second tube) having an inner tube diameter configured to receive and house the right piercer 234. Similarly, in various embodiments, a central piercer assembly 246 comprises a central strut 226 and a central piercer 236 disposed within the central strut 226; and, in various embodiments, the central strut 226 comprises a central tube 227 having an inner tube diameter configured to receive and house the central piercer 236.

Figure 3A:
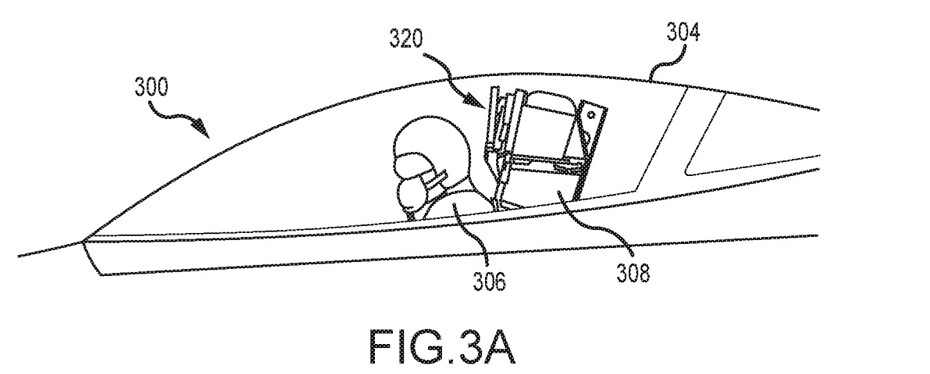
FIG. 3A illustrates an occupant seated on an ejection seat in a cockpit of an aircraft prior to initiation of an ejection sequence, in accordance with various embodiments.
Figure 3B:
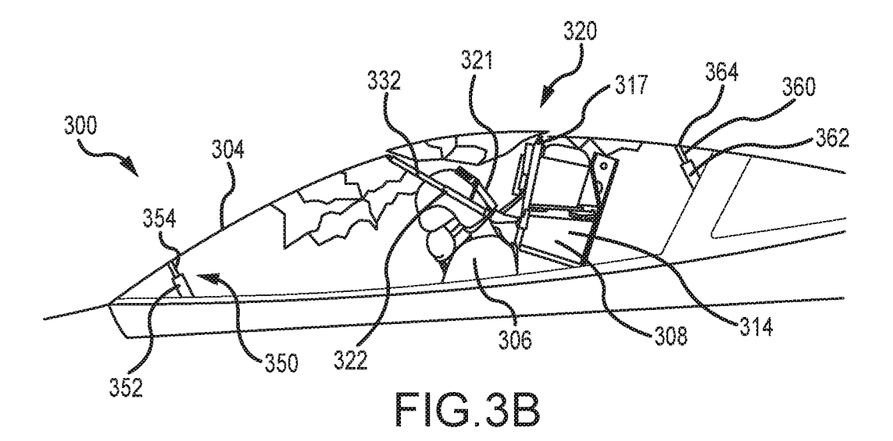
FIGS. 3B and 3C illustrate an occupant seated on an ejection seat in a cockpit of an aircraft subsequent to initiation of an ejection sequence, in accordance with various embodiments.
Figure 3C:
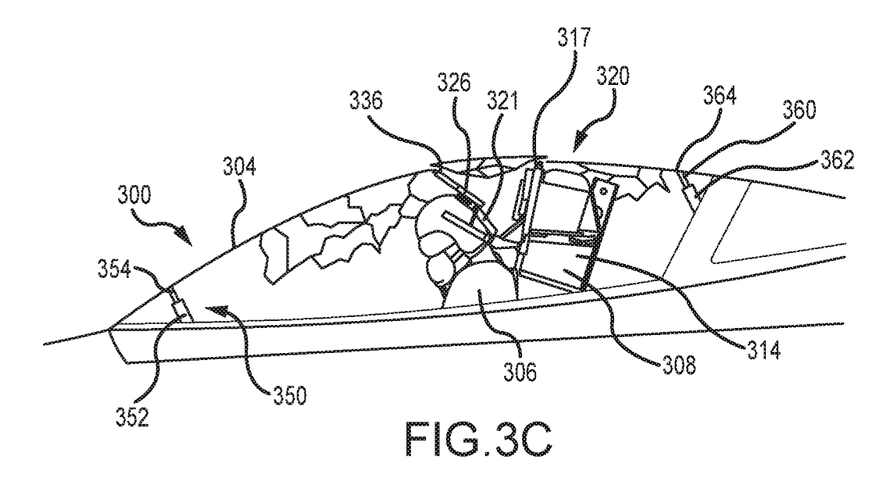

Referring now to FIGS. 3A, 3B and 3C, various embodiments having piercer assemblies mounted to a passive head and neck protection system are illustrated during operation of an ejection sequence to fracture a canopy. Referring to FIG. 3A, for example, a cockpit portion of an aircraft 300 is illustrated as enclosed by a canopy 304 prior to initiation of an ejection sequence. An occupant 306 is illustrated seated in an ejection seat 308, which includes a moveable headrest 320 configured to deploy from a stowed position to a deployed position as described above with reference to FIGS. 1B and 2A.

Referring now to FIGS. 3B and 3C, during operation, the ejection seat 308 is propelled toward the canopy 304 via an explosive or a rocket motor, such as, for example, the rocket motor 116 described above with reference to FIG. 1B. The canopy 304 is typically constructed of an acrylic or similar type material that is subject to fracture on impact. As the ejection seat 308 accelerates toward the canopy 304, the moveable headrest 320 deploys, similar to the deployment of the moveable headrest 220 described above with reference to FIG. 2A. For example, in various embodiments, a left strut 322 and a right strut (hidden behind the left strut 322) and a head panel 321 rotate forward and downward from a seat back 314 to hold the head of the occupant 306 in a desired position during the ejection sequence.

Upon contact with the canopy 304, a seat back piercer 317 that is mounted to the seat back 314 fractures the canopy, as illustrated in FIGS. 3B and 3C, in an area local to the point of contact between the seat back piercer 317 and the canopy 304. Desirably, the fracture of the canopy 304 caused by contact with the seat hack piercer 317 will extend throughout the canopy 304, or at least a portion of the canopy 304 sufficient in size to allow the ejection seat 308 and the occupant 306 to exit the cockpit without making contact with unfractured portions of the canopy. In order to promote a more complete fracture of the canopy 304, other piercers, in addition to the seat back piercer 317, may be activated at locations other than the point of contact between the seat back piercer 317 and the canopy 304.

Referring to FIG. 3B, for example, following deployment of the moveable headrest 320, as described above, a left piercer 332 is propelled from a left strut 322 of the moveable headrest 320, while a right piercer (hidden behind the left piercer 332) is propelled from a right strut (hidden behind the left strut 322) of the moveable headrest 320. In various embodiments, the left piercer 332 and the left strut 322, the right piercer and the right strut and the moveable headrest 320 share similar structural and operational characteristics to the left piercer 232 and the left strut 222, the right piercer 234 and the right strut 224 and the moveable headrest 220 described above with reference to FIGS. 2B and 2C. In various embodiments, the left piercer 332 and the right piercer are propelled from their corresponding struts such that both strike the canopy 304 at approximately the same time the seat back piercer 317 strikes the canopy 304. This results in three points of contact with the canopy 304, simultaneously or near simultaneously in time, to promote a more complete fracture of the canopy 304, thereby providing for an enlarged fracture area of the canopy 304 that the ejection seat 308 and the occupant 306 may pass through during the ejection sequence. In various embodiments, during an ejection sequence, the seat back piercer 317 is configured to strike the canopy 304 first, followed by the left piercer 332 and the right piercer, such that a main footprint of the canopy 304 is fractured first by the seat back piercer 317, with the left piercer 332 and the right piercer fracturing those portions of the canopy 304 in the vicinity of the main foot print not previously fractured by the seat back piercer 317. In this context, a main footprint of the canopy 304 refers to that surface area of the canopy 304 typically required to be fractured in order to safely expel the ejection seat 308 and the occupant 306.

Similarly, referring to FIG. 3C, following deployment of the moveable headrest 320, as described above, a central piercer 336 is propelled from a central strut 326 of the moveable headrest 320. In various embodiments, the central piercer 336, the central strut 326 and the moveable headrest 320 share similar structure and operational characteristics to the central piercer 236, the central strut 226 and the moveable headrest 220 described above with reference to FIGS. 2B and 2C. In various embodiments, the central piercer 336 is propelled from the central strut 326 it strikes the canopy 304 at approximately the same time the seat back piercer 317 strikes the canopy 304. This results in two points of contact with the canopy 304, simultaneously or near simultaneously in time, to promote a more complete fracture of the canopy 304, thereby providing for an enlarged fracture area of the canopy 304 that the ejection seat 308 and the occupant 306 may pass through during the ejection sequence. In various embodiments, during an ejection sequence, the seat back piercer 317 is configured to strike the canopy 304 first, followed by the central piercer 336, such that the main footprint of the canopy 304 (described above) is fractured first by the seat back piercer 317, with the central piercer 336 fracturing those portions of the canopy 304 in the vicinity of the main foot print not previously fractured by the seat back piercer 317.

Still referring to FIGS. 3B and 3C, a combination of the foregoing description is contemplated. For example, in various embodiments, following deployment of the moveable headrest 320, the left piercer 332 is propelled from the left strut 322, the right piercer (hidden behind the left piercer 332) is propelled from the right strut (hidden behind the left strut 322) and the central piercer 336 is propelled from the central strut 326 at approximately the same time the seat back piercer 317 strikes the canopy 304. This results in four points of contact with the canopy 304, simultaneously or near simultaneously in time, to promote a more complete fracture of the canopy 304, thereby providing for an enlarged fracture area of the canopy 304 that the ejection seat 308 and the occupant 306 may pass through during the ejection sequence. Similar to the foregoing, in various embodiments, the seat back piercer 317 is configured to strike the canopy 304 first, followed by each of the left piercer 332, the right piercer and the central piercer 336, such that the main footprint of the canopy 304 (described above) is fractured first by the seat back piercer 317, with the left piercer 332, the right piercer and the central piercer 336 fracturing those portions of the canopy 304 in the vicinity of the main foot print not previously fractured by the seat back piercer 317.

Further, in various embodiments, additional piercers or piercer assemblies may be positioned about the cockpit and configured to fracture the canopy upon initiation of an ejection sequence. For example, as illustrated in FIGS. 3B and 3C, a forward piercer assembly 350 comprises a forward strut 352 and a forward piercer 354 slidably disposed within the forward strut 352 and an aft piercer assembly 360 comprises an aft strut 362 and an aft piercer 364 disposed within the aft strut 362. In various embodiments, following deployment of the moveable headrest 320, the forward piercer 354 is propelled from the forward strut 352 and the aft piercer 364 is propelled from the aft strut 362 at approximately the same time the seat back piercer 317 strikes the canopy 304. This results in additional points of contact with the canopy 304, simultaneously or near simultaneously in time, to promote a more complete fracture of the canopy 304, thereby providing for an enlarged fracture area of the canopy 304 that the ejection seat 308 and the occupant 306 may pass through during the ejection sequence.

Figure 3D:
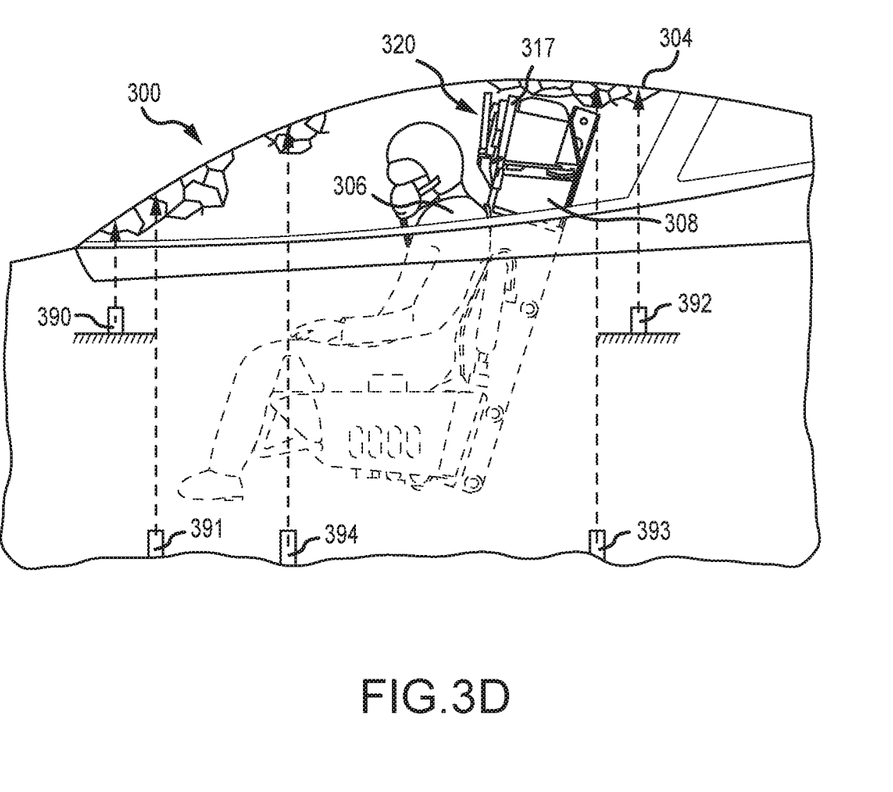
FIG. 3D illustrates an occupant seated on an ejection seat in a cockpit of an aircraft subsequent to initiation of an ejection sequence, in accordance with various embodiments.

Referring now to FIG. 3D, in various embodiments, additional piercers or piercer assemblies may also be positioned at locations within the cockpit that are located a distance from the canopy 304 in order not to potentially interfere with an occupant's visualization of instruments or objects outside of the aircraft. For example, a first forward piercer 390 may be positioned below the canopy but elevated a distance off the floor of the cockpit, while a second forward piercer 391 may be positioned proximate the floor of the cockpit. Similarly, a first aft piercer 392 may be positioned below the canopy but elevated a distance off the floor of the cockpit, while a second aft piercer 393 may be positioned proximate the floor of the cockpit. A mid-cockpit piercer 394 may be positioned proximate the occupant. In each of the above embodiments, the various forward, aft and mid-cockpit piercers may be positioned on the port or starboard sides of the occupant 306 in order to effectively fracture the entire canopy 304 during an ejection sequence. As with the above descriptions regarding sequence of operation, in various embodiments, the seat back piercer 317 is configured to strike the canopy 304 first, followed by one or more of the various forward, aft and mid-cockpit piercers, such that the main footprint of the canopy 304 (described above) is fractured first by the seat back piercer 317, with the various forward, aft and mid-cockpit piercers fracturing those portions of the canopy 304 in the vicinity of the main foot print not previously fractured by the seat back piercer 317. Further, in various embodiments, the sequence may be reversed, such that the various forward, aft and mid-cockpit piercers are configured to fracture the canopy 304 first, followed by the seat back piercer 317.

Figure 4:
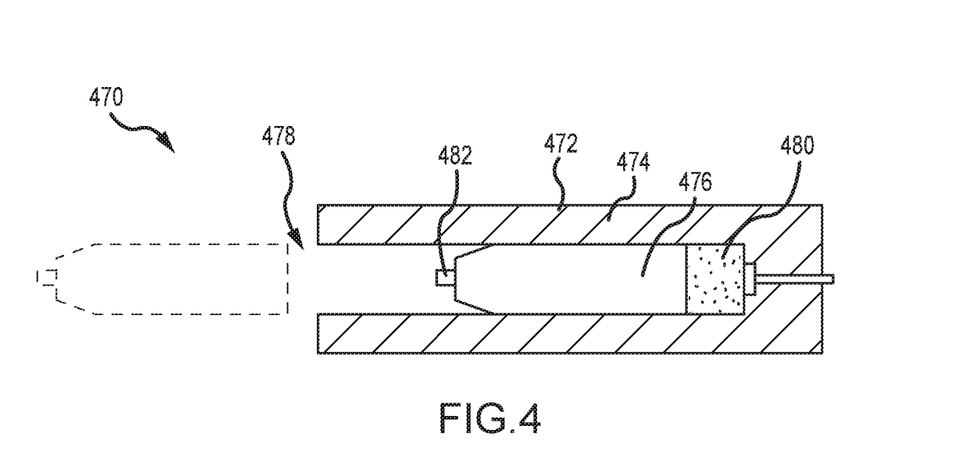
FIG. 4 illustrates a piercer assembly, in accordance with various embodiments.

Referring now to FIG. 4, a piercer assembly 470, such as, for example, any of the piercer assemblies described above with reference to FIGS. 2A-2C and FIGS. 3A-3D, is illustrated. In various embodiments, the piercer assembly 570 includes a strut 472 (or a hollow tube 474) and a piercer 476 configured to be propelled out of an opening 478. In various embodiments, the piercer 476 is propelled from within the hollow tube 474 by a propulsive device which, in various embodiments, for example, may take the form of an explosive charge 480 or a spring member (see FIG. 5) or some similar device configured to store sufficient potential energy to propel the piercer 476 toward a canopy with a velocity sufficient to fracture the canopy. In various embodiments, the piercer 476 may include a tip portion 482 configured to focus fracture energy on a small portion of a canopy during an ejection sequence.

Figure 5:
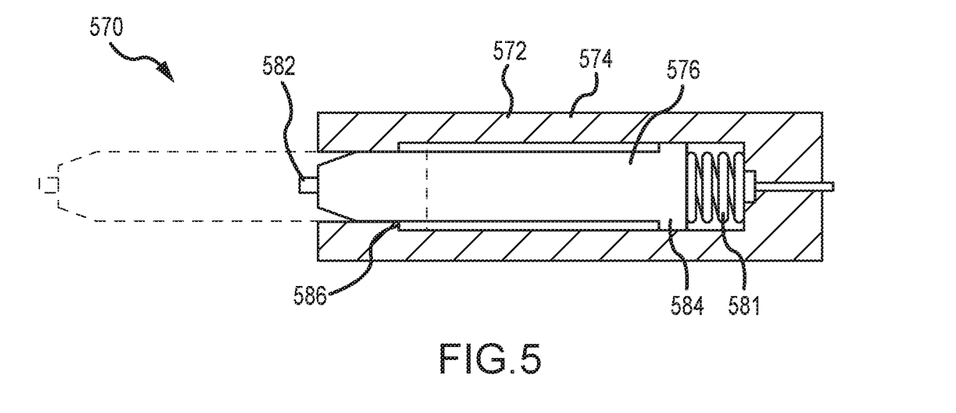
FIG. 5 illustrates a piercer assembly, in accordance with various embodiments.

Similarly, referring to FIG. 5, a piercer assembly 570, such as, for example, any of the piercer assemblies described above with reference to FIGS. 2A-2C and FIGS. 3A-3D, is illustrated. In various embodiments, the piercer assembly 570 includes a strut 572 (or a hollow tube 574) and a piercer 576 configured to be propelled out of an opening 578. In various embodiments, the piercer 576 is propelled from within the hollow tube 574 by a propulsive device which, in various embodiments, for example, may take the form of an explosive charge (see FIG. 4) or a spring member 581 or some similar device configured to store sufficient potential energy to propel the piercer 576 toward a canopy with a velocity sufficient to fracture the canopy. In various embodiments, the piercer 576 may include a tip portion 582 configured to focus fracture energy on a small portion of a canopy during an ejection sequence. In various embodiments, the piercer 576 may include a rim portion 584 that is configured to make contact with a stop portion 586 extending inward from the hollow tube 574 to stop the piercer 576 from fully exiting the hollow tube following initiation of an ejection sequence.

Figure 6:
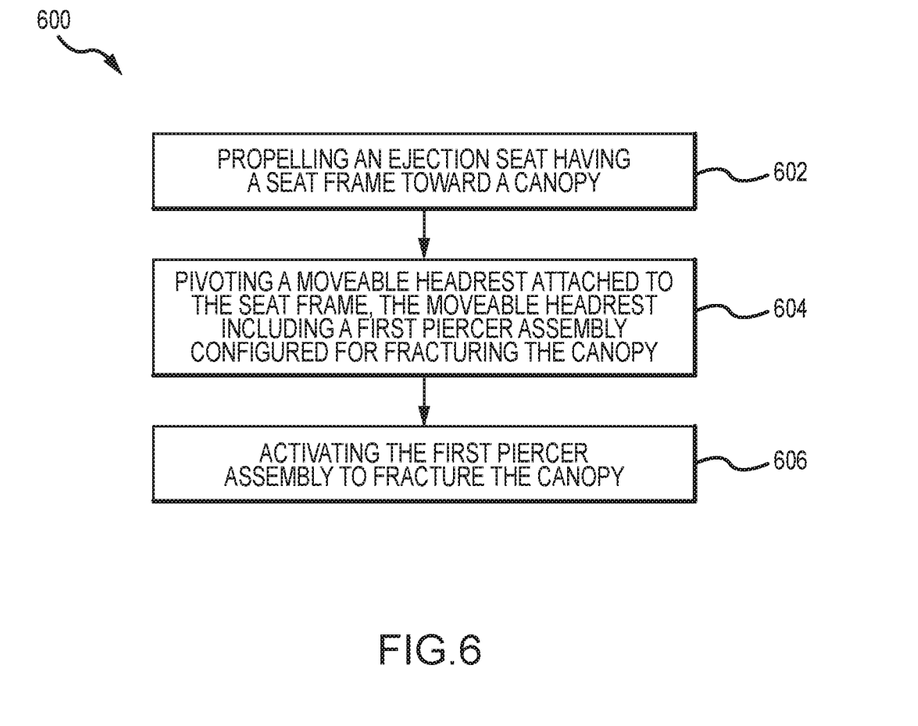
FIG. 6 describes a method of ejecting an occupant from an aircraft cockpit covered by a canopy.

Referring now to FIG. 6, a method 600 of ejecting an occupant from an aircraft cockpit covered by a canopy is disclosed. In various embodiments, a first step 602 includes propelling an ejection seat having a seat frame toward the canopy. During a second step 604 the method includes pivoting a moveable headrest attached to the seat frame, the moveable headrest including a first piercer assembly configured for fracturing the canopy. A third step 606 includes activating the first piercer assembly to fracture the canopy. In various embodiments, the method 600 includes use of the various embodiments described above, including the positioning of piercer assemblies in various positions on the moveable headrest or forward or aft of the ejection seat and activating the piercer assemblies to fracture the canopy at approximately the same time a seat back piercer strikes the canopy.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials, Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for," As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An ejection seat for an aircraft, comprising:
    a seat frame; and
    a moveable headrest pivotably attached with respect to the seat frame, the moveable headrest including a first piercer assembly configured for fracturing a canopy,
    wherein the first piercer assembly is connected to the moveable headrest and configured to pivot in unison with the moveable headrest.

2. The ejection seat of claim 1, wherein the moveable headrest includes a head panel and the first piercer assembly is attached to the head panel.

3. The ejection seat of claim 2, wherein the first piercer assembly includes a first hollow tube and a first piercer slidably disposed within the first hollow tube.

4. The ejection seat of claim 3, wherein the moveable headrest includes a strut disposed proximate a first side of the head panel.

5. The ejection seat of claim 4, wherein the strut comprises a second hollow tube and a second piercer slidably disposed within the second hollow tube and configured for fracturing the canopy.

6. The ejection seat of claim 1, wherein the moveable headrest includes a first strut disposed on a first side of the moveable headrest.

7. The ejection seat of claim 6, wherein the first piercer assembly includes the first strut and a first piercer slidably disposed within the first strut.

8. The ejection seat of claim 7, further comprising a second piercer assembly configured for fracturing the canopy.

9. The ejection seat of claim 8, wherein the second piercer assembly includes a second strut and a second piercer slidably disposed within the second strut.

10. The ejection seat of claim 9, wherein the second strut is disposed on a second side of the moveable headrest.

11. The ejection seat of claim 10, further comprising a head panel and a third piercer assembly mounted on the head panel and configured for fracturing the canopy.

12. A system for fracturing a canopy of an aircraft, comprising:
    an ejection seat having a seat frame; and
    a moveable headrest pivotably attached with respect to the seat frame, the moveable headrest including a first piercer assembly configured for fracturing the canopy,
    wherein the first piercer assembly is connected to the moveable headrest and configured to pivot in unison with the moveable headrest.

13. The system of claim 12, wherein the moveable headrest includes a first strut disposed on a first side of the moveable headrest and a second strut disposed on a second side of the moveable headrest.

14. The system of claim 13, wherein the first piercer assembly includes the first strut.

15. The system of claim 14, further comprising a second piercer assembly.

16. The system of claim 15, wherein the second piercer assembly includes the second strut.

17. The system of claim 12, further comprising at least one of an aft piercer assembly disposed aft of the ejection seat and configured for fracturing the canopy and a forward piercer assembly disposed forward of the ejection seat and configured for fracturing the canopy.

18. A method of ejecting an occupant from an aircraft cockpit covered by a canopy, comprising:
    propelling an ejection seat having a seat frame toward the canopy;
    pivoting a moveable headrest pivotably attached with respect to the seat frame, the moveable headrest including a first piercer assembly configured for fracturing the canopy; and
    activating the first piercer assembly to fracture the canopy,
    wherein the first piercer assembly is connected to the moveable headrest and configured to pivot in unison with the moveable headrest.

19. The method of claim 18, further comprising activating a second piercer assembly attached to the moveable headrest.

20. The method of claim 19, wherein the moveable headrest includes a first strut disposed on a first side of the moveable headrest and wherein the first piercer assembly includes the first strut.

* * * * *